US008555064B2

(12) United States Patent
Suh et al.

(10) Patent No.: US 8,555,064 B2
(45) Date of Patent: Oct. 8, 2013

(54) SECURITY SYSTEM AND METHOD FOR WIRELESS COMMUNICATION SYSTEM

(75) Inventors: Kyung Joo Suh, Seoul (KR); Kyeong In Jeong, Hwaseong-si (KR); Chae Gwon Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 626 days.

(21) Appl. No.: 12/609,410

(22) Filed: Oct. 30, 2009

(65) Prior Publication Data
US 2010/0115275 A1 May 6, 2010

(30) Foreign Application Priority Data

Nov. 3, 2008 (KR) ........................ 10-2008-0108582

(51) Int. Cl.
*H04L 9/32* (2006.01)
*G06F 15/16* (2006.01)
*H04K 1/00* (2006.01)
*H04L 9/00* (2006.01)

(52) U.S. Cl.
USPC ............... 713/168; 713/171; 726/3; 380/270; 380/277

(58) Field of Classification Search
USPC ................. 713/155–159, 168–174, 182–186, 713/202; 709/225, 229; 726/2–8; 455/418–419; 370/335
See application file for complete search history.

(56) References Cited

U.S. PATENT DOCUMENTS

| 7,403,621 | B2 | 7/2008 | Vialen et al. | |
|---|---|---|---|---|
| 2003/0200431 | A1* | 10/2003 | Stirbu | 713/168 |
| 2004/0224669 | A1 | 11/2004 | Pedlar et al. | |
| 2009/0025060 | A1* | 1/2009 | Mukherjee et al. | 726/3 |
| 2010/0054472 | A1* | 3/2010 | Barany et al. | 380/270 |

FOREIGN PATENT DOCUMENTS

| KR | 10-0745237 B1 | 8/2007 | |
|---|---|---|---|
| WO | WO 2006022469 A1 * | 3/2006 | |

OTHER PUBLICATIONS

Universal Mobile Telecommunications Systems (UMTS); Radio Ressource Control (RRC) Protocol Specification, ETSI TS 125 331 V4.2.1, Oct. 2001.

* cited by examiner

*Primary Examiner* — Evans Desrosiers
(74) *Attorney, Agent, or Firm* — Jefferson IP Law, LLP (57) ABSTRACT

A security system processing method of a User Equipment (UE) and a security system for a wireless communication system are provided. The security processing method of the UE includes transmitting a Layer 3 message including a UE security capability to a Mobility Management Entity (MME) and the eNB, receiving a Access Stratum Security Mode Command (AS SMC) including a AS security algorithm selected by the eNB, as a result of verification of the UE security capability and information received from the MME, and a AS Message Authentication Code (MAC), transmitting a AS security mode complete message including the AS SMC to the eNB after verification of integrity of the AS SMC using the AS MAC, and transmitting, when receiving a Non Access Stratum (NAS) SMC including the UE security capability, a NAS security mode complete message to the MME after verification of integrity of the NAS SMC.

16 Claims, 7 Drawing Sheets

SECURITY SYSTEM AND METHOD FOR WIRELESS COMMUNICATION SYSTEM

PRIORITY

This application claims the benefit under 35 U.S.C. §119 (a) of a Korean patent application filed in the Korean Intellectual Property Office on Nov. 3, 2008 and assigned Serial No. 10-2008-0108582, the entire disclosure of which is hereby incorporated by reference.

BACKGROUND OF THE INVENTION

1. Field of the Invention

The present invention relates to wireless communication system. More particularly, the present invention relates to a security system and method for protecting a control message exchange from attacks in a wireless communication system.

2. Description of the Related Art

In an Evolved Packet System (EPS) under development for an evolution or migration of a $3^{rd}$ Generation Partnership Project (3GPP), Mobility Management Entity (MME) is a control entity responsible for mobility management of a control plane. With the introduction of the MME, research is being conducted to reinforce security using a Non Access Stratum (NAS) protocol in addition to security and authentication procedures executed on an Access Stratum (AS). The research focuses on reinforced security management with independent security procedures on an AS layer and an NAS layer.

A current AS protocol-based security management method uses User Equipment (UE) security capability information derived from a UE security capability acquired by the NAS protocol. However, detailed procedures and features for validating information delivered in the NAS information are specified. Accordingly, currently specified procedures and messages are vulnerable to attacks, such as a Man-In-The-Middle (MITM) attack. Therefore, it is required to modify at least one of the NAS protocol, a AS protocol and an S1 interface message to reinforce the security.

Furthermore, a current 3GPP Evolved Packet System (EPS) assumes the UE security capability for use on an AS level is derived from the UE security capability of an NAS level, but does not specify any mechanism for security capability validation. Thereby, the UE security capability may be exposed to attacks, such as the MITM attack.

Therefore, a need exists for a security system and method for securing attacks in a wireless communication system.

SUMMARY OF THE INVENTION

An aspect of the present invention is to address at least the above-mentioned problems and/or disadvantages and to provide at least the advantages described below. Accordingly, an aspect of the present invention provide a security system and method for efficiently reinforcing security in a wireless communication system providing a security mechanism using authentication between an User Equipment (UE) and a network, and protected Non Access Stratum (NAS) messages between the UE and a Mobility Management Entity (MME).

Another aspect of the present invention is to provide a security system and method for reinforcing security in a wireless communication system with a UE security capability validation mechanism.

In accordance with an aspect of the present invention, a security processing method of a User Equipment (UE) in a wireless communication system is provided. The method includes transmitting a Layer 3 (L3) message including a UE security capability to a Mobility Management Entity (MME) and an evolved Node B (eNB), receiving an Access Stratum Security Mode Command (AS SMC) including a AS security algorithm selected by the eNB, as a result of verification of the UE security capability and information received from the MME, and a AS Message Authentication Code (MAC), transmitting a AS security mode complete message including the AS SMC to the eNB after verification of integrity of the AS SMC using the AS MAC, and transmitting, when receiving a Non Access Stratum (NAS) SMC including the UE security capability, a NAS security mode complete message to the MME after verification of integrity of the NAS SMC.

In accordance with another aspect of the present invention, a security processing method of an evolved Node B (eNB) in a wireless communication system is provided. The method includes receiving a Layer 3 (L3) message including a User Equipment (UE) security capability from a UE, receiving a Security Mode Command (SMC) including the UE security capability from a Mobility Management Entity (MME), selecting an Access Stratum (AS) security algorithm with verification of the UE security capability by comparing the UE security capability received from the UE and UE security capability carried by the SMC, transmitting an AS SMC including the selected AS security algorithm and an AS Message Authentication Code (AS MAC) to the UE, and transmitting, when a AS security mode complete message including the AS SMC is received, an SMC response message to the MME.

In accordance with still another aspect of the present invention, a security processing method of a User Equipment (UE) in a wireless communication system is provided. The method includes transmitting a Layer 3 (L3) message including a UE security capability to a Mobility Management Entity (MME), receiving an Access Stratum Security Mode Command (AS SMC) including the UE security capability, a AS security algorithm and a AS Message Authentication Code (MAC) from an evolve Node B (eNB), verifying integrity of the AS SMC using the AS MAC, receiving a Non Access Stratum (NAS) SMC including the UE security capability from the MME, and verifying the UE security by comparing the UE securities received from the eNB and the MME and transmitting an AS security mode complete message to the eNB and a NAS security mode complete message to the MME.

In accordance with yet another aspect of the present invention, a security processing method of an evolved Node B (eNB) for managing a User Equipment (UE) security capability in a wireless communication system is provided. The method includes receiving a Security Mode Command (SMC) including the UE security capability selected by a Mobility Management Entity (MME), selecting an Access Stratum (AS) security algorithm indicated in the SMC and transmitting a AS SMC including the UE security capability, the AS security algorithm, and a AS Message Authentication Code (MAC) to the UE, and transmitting, when a AS security mode complete message including the AS Message Authentication Code (MAC) is received from the UE, an SMC response message including the AS security mode complete message to the MME.

In accordance with a further aspect of the present invention, a security processing method of a User Equipment (UE) in a wireless communication system is provided. The method includes transmitting a Layer 3 (L3) message including a UE security capability to a Mobility Management Entity (MME), receiving an Access Stratum Security Mode Command (AS SMC) including the UE security capability, an AS security algorithm, and a AS Message Authentication Code (MAC)

from an evolved Node B (eNB), transmitting a AS security mode complete message to the eNB after verifying integrity of the AS SMC message using the AS MAC, receiving a Non Access Stratum (NAS) SMC including the UE security capability from the MME, and transmitting a NAS security mode complete message to the MME after verifying the UE security capability by comparing the UE security capabilities received from the eNB and MME.

In accordance with another aspect of the present invention, a security processing method of an evolved Node B (eNB) for managing a User Equipment (UE) security capability in a wireless communication system is provided. The method includes receiving a Security Mode Command (SMC) including the UE security capability selected by a Mobility Management Entity (MME), selecting an Access Stratum (AS) security algorithm indicated in the SMC and transmitting a AS SMC including the UE security capability, the AS security algorithm, and a AS Message Authentication Code (MAC) to the UE, and transmitting, when a AS security mode complete message including an AS Message Authentication Code (MAC) is received from the UE, an SMC response message including the AS security mode complete message to the MME after verifying integrity of the message received from the UE.

In accordance with still another aspect of the present invention, a security system for a wireless communication system is provided. The system includes a User Equipment (UE) for transmitting a Layer 3 (L3) message including a UE security capability, for verifying an Access Stratum Security Mode Command (AS SMC) using a AS Message Authentication Code (MAC), when the AS SMC including a AS security algorithm and a AS MAC is received, for transmitting a AS security mode complete message in response to the AS SMC, for verifying integrity of a Non Access Stratum (NAS SMC), when the NAS SMC includes the UE security capability, and for transmitting an NAS security mode complete message in response to the NAS SMC, an evolved Node B (eNB) for receiving the UE security capability from the UE and an SMC including the UE security capability, for selecting the AS security algorithm as a result of verification of the UE security capability, for transmitting the AS SMC including the selected AS security algorithm and the AS MAC to the UE, and for transmitting an SMC response message including the selected AS security algorithm and the AS security mode complete message in response to the SMC message, when the AS security mode complete message including the AS MAC is received from the UE, and a Mobility Management Entity (MME) for selecting an NAS security algorithm, when the UE security capability is received from the UE, and for transmitting the SMC including the UE security capability to the eNB and the NAS AMC including the UE security capability to the UE.

In accordance with yet another aspect of the present invention, a security system for a wireless communication system is provided. The system includes a User Equipment (UE) for transmitting a Layer 3 (L3) message including a UE security capability, for verifying integrity of an Access Stratum Security Mode Command (AS SMC) using a AS Message Authentication Code (MAC), when the AS SMC including a AS security algorithm and the AS MAC is received, for verifying the UE security capabilities carried by the AS SMC and a Non Access Stratum (NAS) SMC, when the NAS SMC includes the UE security capability, for transmitting a AS security mode complete message in response to the AS SMC and an NAS security mode complete message in response to the NAS SMC, an evolved Node B (eNB) for selecting the AS security algorithm and transmitting the AS SMC including the selected AS security algorithm and the AS MAC to the UE, when the SMC including the UE security capability is received, and for transmitting a SMC response message including the selected AS security algorithm and the security mode complete message in response to the SMC, when the AS security mode complete message including the AS MAC is received from the UE, and a Mobility Management Entity (MME) for selecting a NAS security algorithm, when the UE security capability is received from the UE, and for transmitting the SMC including the UE security capability to the eNB and the NAS SMC including the UE security capability to the UE.

In accordance with another aspect of the present invention, a security system for a wireless communication system is provided. The system includes a User Equipment (UE) for transmitting a Layer 3 (L3) message including a UE security capability, for verifying integrity of an Access Stratum Security Mode Command using a AS Message Authentication Code (MAC), when the AS SMC including a AS security algorithm and the AS MAC is received, for transmitting a AS security mode complete message including the AS MAC in response to the AS SMC, for verifying the UE security capabilities carried by the AS SMC and a Non Access Stratum (NAS) SMC and integrity of the NAS SMC, when the NAS SMC includes the UE security capability, and for transmitting a NAS security mode complete message in response to the NAS SMC, an evolved Node B (eNB) for selecting, the AS security algorithm and transmitting the AS SMC including the selected AS security algorithm and the AS MAC to the UE, when an SMC including the UE security capability is received, and for transmitting an SMC response message including the selected AS security algorithm and the security mode complete message in response to the SMC, when the AS security mode complete message including the AS MAC is received from the UE, and a Mobility Management Entity (MME) for selecting a NAS security algorithm, when the UE security capability is received from the UE, and for transmitting the SMC including the UE security capability to the eNB and the NAS SMC including the UE security capability to the UE.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
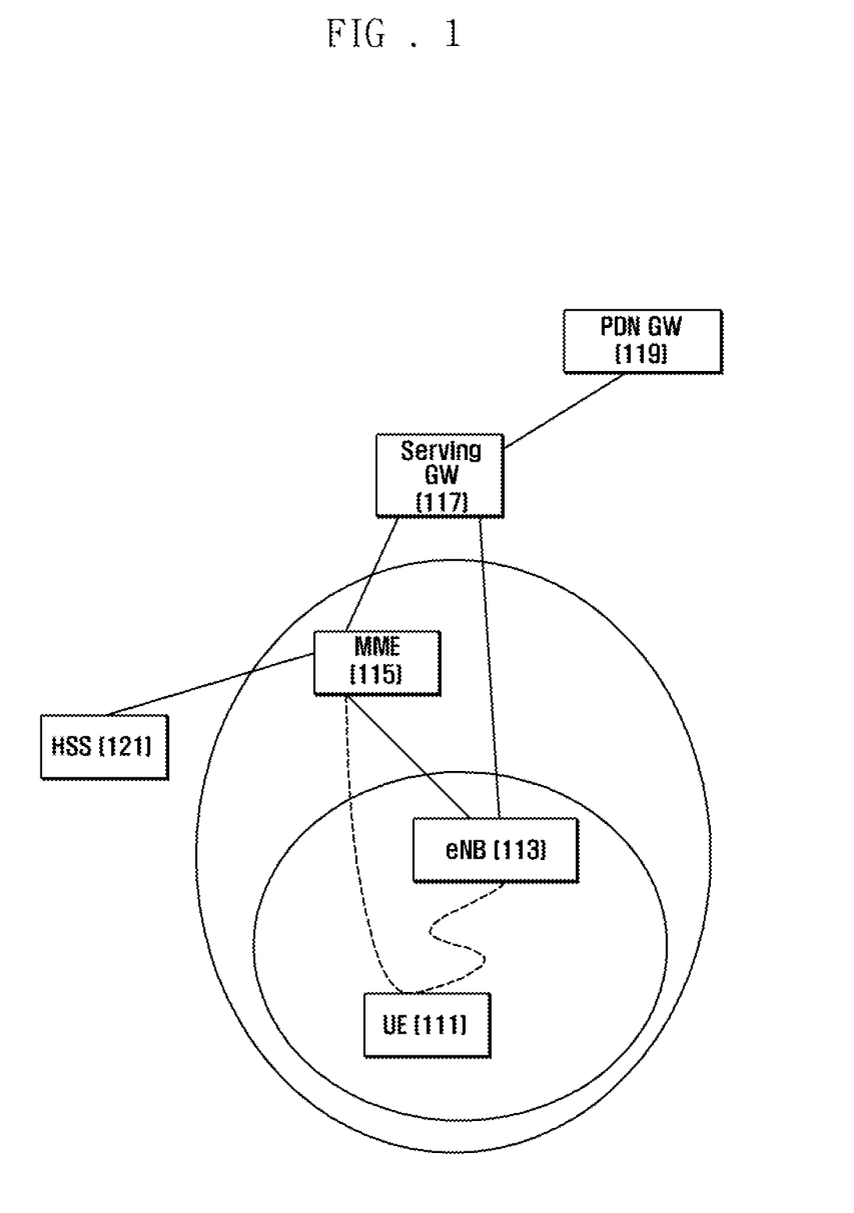
FIG. 1 is a schematic diagram illustrating a wireless communication system of a security method according to an exemplary embodiment of the present invention.

FIG. 1 is a schematic diagram illustrating a wireless communication system of a security method according to an exemplary embodiment of the present invention. In an exemplary implementation, the security method may exchange control information among a User Equipment (UE), an evolved Node B (eNB) and a Mobility Management Entity (MME) by using a Non Access Stratum (NAS) protocol, an Access Stratum (AS) protocol and an S1 interface between the eNB and the MME.

Referring to FIG. 1, the wireless communication system includes the UE 111, the eNB 113, the MME 115, a Serving Gateway (S-GW) 117, a Packet Data Network Gateway (P-GW) 119 and a Home Subscriber Server (HSS) 121.

The eNB 113 is responsible for establishing a radio link with the UE 111 located in a cell as its service area. The UE 111 is a subscriber terminal which accesses a packet data network, such as the Internet via the S-GW 117. The P-GW 119 is responsible for a Home Agent (HA) function. The MME 115 is responsible for mobility management, location management of the UE, and registration management. The HSS 121 is responsible for management of authentication and service information related to a subscriber and the UE 111, and connected to the MME 115 via an interface.

The eNB 113 and S-GW 117 are connected via an $S_{1-U}$ interface for data link, and the S-GW 117 and the MME 115 are connected via an $S_{11}$ interface for mobile management of the UE 111. In an exemplary implementation, the MME 115 communicates with the UE 111 using the NAS protocol for the mobility management, the location management, the registration management and a session management. Conventionally, there is a lack of discussion on the NAS protocol security procedure and roles of the network entities to support integrity and ciphering on the NAS protocol. Exemplary embodiments of the present invention provide the security procedure and roles of the network entities related to the NAS protocol.

In an exemplary implementation, in order to efficiently support the transmission and validation of security information, an NAS signaling link between the UE 111 and the MME 115 is called link A, a AS signaling link between the UE 111 and the eNB 113 is called link B, and an S1 protocol link between the eNB 113 and the MME 115 is called link C.

The security procedures and operations of entities of the wireless communication system as illustrated in FIG. 1 are described with reference to FIGS. 2 to 7 below.

Figure 2:
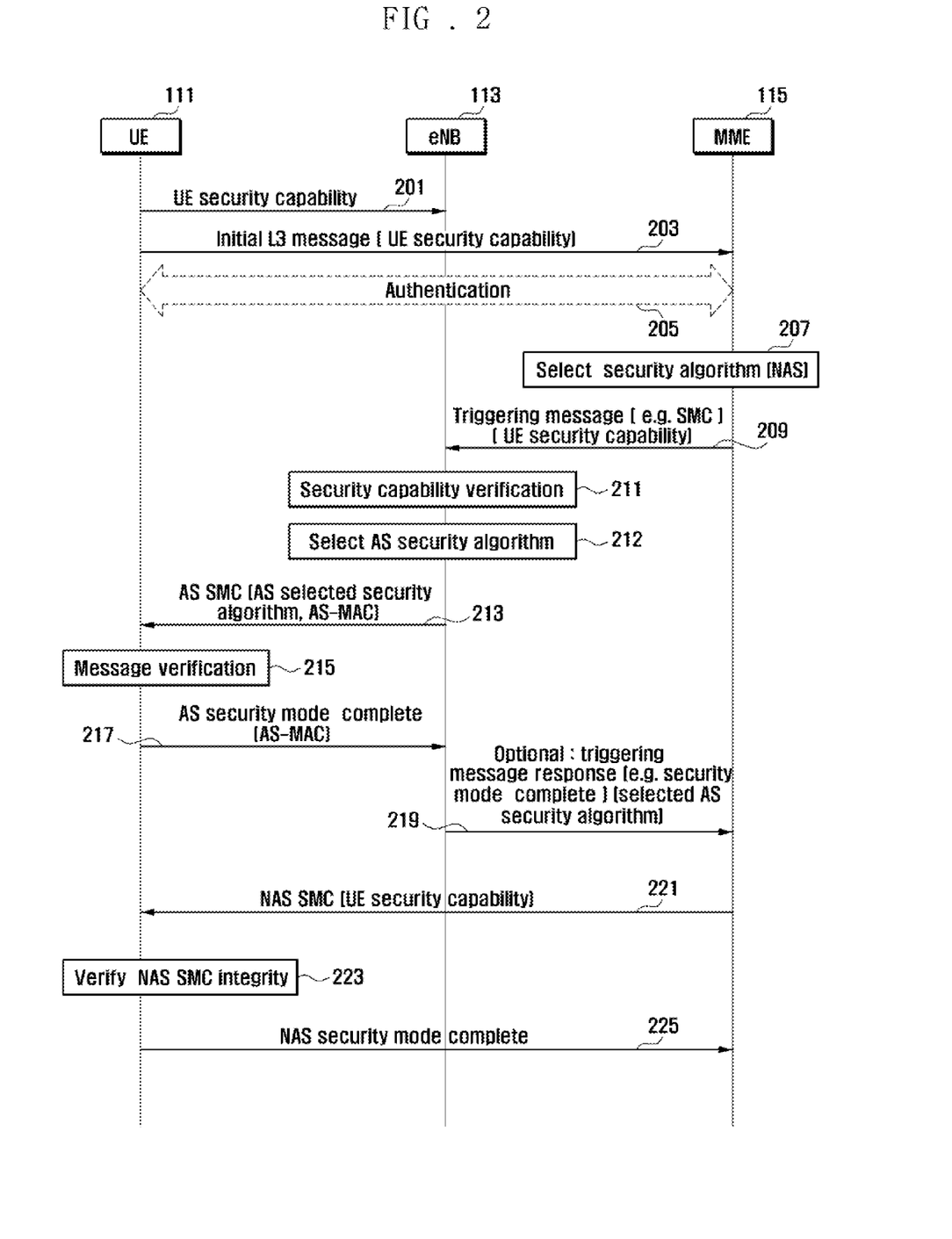
FIG. 2 is a sequence diagram illustrating operations of entities of a wireless communication system of a security method according to an exemplary embodiment of the present invention.

FIG. 2 is a sequence diagram illustrating operations of entities of a wireless communication system of a security method according to an exemplary embodiment of the present invention.

Referring to FIG. 2, the UE 111 transmits a UE security capability to an eNB 113 in step 201. Sequentially, the UE 111 transmits an Initial Layer 3 (L3) message (e.g., a NAS message) to the MME 115 in step 203. At this time, the Initial L3 message includes the UE security capability information. The Initial L3 message may be an Initial ATTACH REQUEST message and a TRACKING AREA UPDATE (hereinafter, called TAU REQUEST) message. The UE 111, the eNB 113 and the MME 115 may then selectively perform one of authentication procedures.

The MME 115 selects a security capability, i.e., a security algorithm, to be used in the following security procedure in step 207. At this time, the MME 115 selects the NAS security capability. After selecting the NAS security capability, the MME 115 transmits to the eNB 113 a triggering message of an AS information Security Mode Command (SMC), including the UE security capability received from the UE 111 in step 203, i.e., SMC message in step 209.

Upon receipt of the SMC message, the eNB 113 compares the UE security capability information received from the UE 111 and UE security capability information received from the MME 115 to validate the UE security capability in step 211. The eNB 113 then selects an AS security algorithm from a list of the security algorithms allowed for network management in step 212. The eNB 113 may select the security algorithm allowed for a AS message transmission which is included in the UE security capability from the MME 115 or a security algorithm in a list of previously allowed security algorithms preset by the eNB 113 and matching the UE security capability, in order of priority. Once the AS security algorithm is selected, the eNB 113 transmits to the UE 111 an AS-SMC message in step 213. The AS-SMC message includes the selected AS security algorithm and an AS Message Authentication Code (AS-MAC).

If the AS-SMC message is received, the UE 111 verifies the AS message integrity in step 215. The UE 111 then transmits to the eNB 113 an AS security mode complete message in step 217. At this time, the AS security mode complete message includes the AS-MAC to guarantee the integrity of the message.

In step 219, upon receipt of the AS security mode complete message, the eNB 113 transmits to the MME 115 a triggering response message in response to a triggering message received in step 209. Here, the triggering response message may be a security mode complete message and is transmitted with an AS selected security algorithm. The AS selected security algorithm may be an example of the UE information transmitted from the MME 115 to a target eNB 113 when the UE moves in an idle mode afterwards.

Upon receipt of the triggering response message, the MME 115 transmits a NAS-SMC message to the UE 111. The NAS-SMC message includes the UE security capability received from the UE in step 203 and is a message integrity-protected by the NAS security algorithm selected in step 207. Accordingly, the NAS security algorithm content carried by the NAS SMC message transmitted according to an exemplary embodiment of the present invention is integrity-protected.

In step 223, if the NAS SMC message is received, the UE 111 verifies the integrity of the NAS SMC message by comparing the UE security capability, which the UE 111 has set in step 201, and the UE security capability contained in the integrity-protected message received at step 221. If the integrity of the NAS SMC message is verified, the UE 111 transmits to the MME 115 a NAS security mode complete message in step 225.

The operations of individual entities involved in the security method above are described below.

The UE 111 transmits the Initial L3 message containing the UE security capability to the eNB 113, receives the AS SMC message containing the AS security algorithm and the AS-MAC from the eNB 113, verifies the AS SMC message, generates an AS security mode complete message containing the AS-MAC, and transmits the AS security mode complete message to the eNB 113. Also, if the NAS SMC message containing the UE security capability is received from the MME 115, the UE verifies the integrity of the NAS SMC message and transmits a NAS security mode complete message to the MME 115.

The eNB 113 receives the UE security capability from the UE 111 and the SMC containing the UE security capability from the MME 115. Once SMC is received following the UE security capability received from the UE 111, the eNB verifies the SMC by comparing the UE securities received from the UE 111 and the MME 115, selects an AS security algorithm, generates an AS SMC message containing the selected AS security algorithm and the AS-MAC, and transmits the AS SMC message to the UE 111. When the AS security mode complete message containing the AS-MAC is received from the UE 111, the eNB 113 generates the triggering response message containing the selected AS security algorithm and security mode complete to the MME 115.

The MME 115 selects a NAS security algorithm upon receipt of the UE security capability, generates and transmits the SMC to the eNB 113, and transmits the NAS SMC message containing the UE security capability to the UE 115. The MME 115 receives the triggering response message containing the AS security mode complete message from the eNB 113 and the NAS security mode complete message from the UE 111 and processes the messages.

Figure 3:
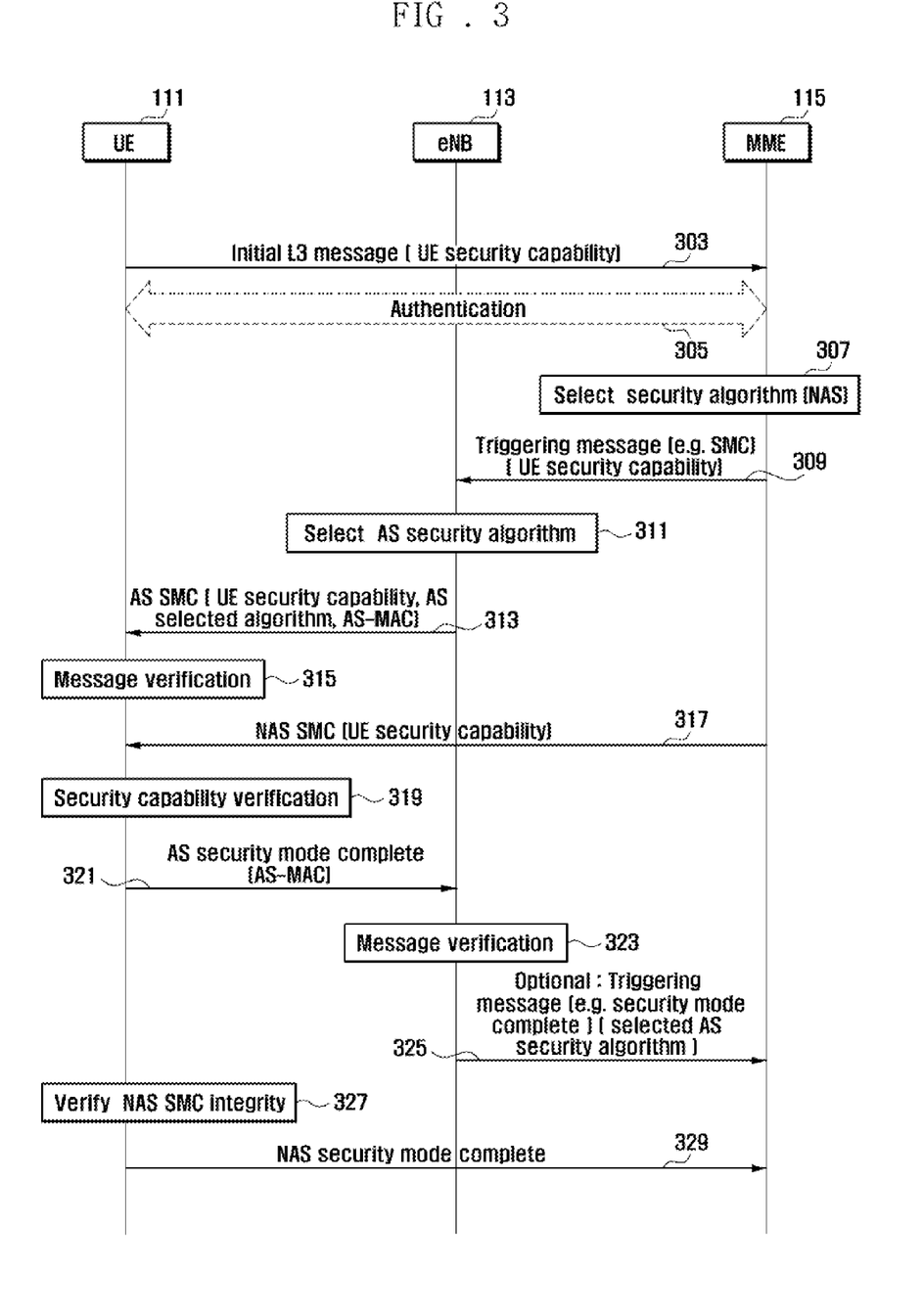
FIG. 3 is a sequence diagram illustrating operations of entities of a wireless communication system of a security method according to an exemplary embodiment of the present invention.

FIG. 3 is a sequence diagram illustrating operations of entities of a wireless communication system of a security method according to an exemplary embodiment of the present invention.

Referring to FIG. 3, a UE 111 transmits an Initial L3 message (e.g., a NAS message) to an MME 115 in step 303. The Initial L3 message includes the UE security capability information. The Initial NAS message may be an Initial ATTACH REQUEST message or a TAU REQUEST message. When the Initial L3 message is received, the MME 115 may optionally perform an authentication procedure with the UE 111 and the eNB 113 in step 305.

Upon receipt of the Initial L3 message, the MME 115 selects a security capability, i.e., the security algorithm, to be used in the following security procedure in step 307. Here, the MME 115 selects the NAS security algorithm. The MME 115 then transmits to the eNB 113 a triggering message for triggering an AS information Security Mode Command (e.g., SMC) in step 309. The triggering message contains the UE security capability received from the UE 111.

Upon receipt of the triggering message, the eNB 113 selects an AS security algorithm from the list of algorithms allowed for use in network management in step 311. At this time, the eNB 113 may select the security algorithm allowed for the AS message transmission which is included in the UE security capability from the MME 115 or a security algorithm in the list of the previously allowed security algorithms preset by the eNB 113 and matching the UE security capability, in order of priority. Once the AS security algorithm is selected, the eNB 113 transmits an AS SMC message to the UE 111 in step 313. Here, the AS SMC message includes an AS selected security algorithm, an AS-MAC and the UE security capability. The UE security capability information is identical with that transmitted from the MME 115 to the eNB 113 in step 309.

Upon receipt of the AS SMC message, the UE 111 verifies the AS SMC message integrity using the MAC information in step 315. The MME 115 transmits an NAS SMC message to the UE 111 in step 317 after transmitting the triggering message to the eNB 113. The NAS SMC message includes the UE security capability received from the UEs to be integrity-protected by the NAS security algorithm selected in step 307. Accordingly, the NAS security algorithm content carried by the NAS SMC message transmitted may be integrity-protected. In step 319, upon receipt of the NAS SMC message, the UE 111 compares the UE security capability received in step 309 and step 313 with the UE security capability received in step 317 to verify the UE security capability in step 319. The UE 111 then transmits an AS security mode complete message to the eNB 113 in step 321. The AS security mode complete message contains the AS MAC information to be integrity-protected. The integrity verification is achieved by the eNB 113 verifying the message in step 323.

The eNB 113 then transmits to the MME 115 a triggering response message, which is optional, in response to the triggering message. The triggering response message may be a security mode complete message and carries the selected AS security algorithm. The AS-selected security algorithm may be transmitted from the MME 115 to a target network as UE information, when the UE 111 moves in an idle mode afterwards.

The UE 111 verifies the NAS SMC message in step 327 by comparing the UE security capability transmitted to the MME 115 in step 301 and the UE security capability contained in the integrity-protected NAS SMC message received from the MME 115 in step 317. If the NAS SMC message is verified, the UE 111 transmits to the MME 115 a NAS security mode complete message in step 329.

The operations of individual entities involved in the security method above are described below.

The UE 111 transmits the L3 message including the UE security capability to the MME 115. If the AS SMC message including the UE security capability, the AS security algorithm and the AS MAC is received from the eNB 113 after transmitting the L3 message to the MME 115, in the UE verifies the integrity of the AS SMC message using the AS MAC. Also, if the NAS SMC message including the UE capability message is received from the MME 115, the UE 111 verifies the UE security capabilities received from the eNB 113 and the MME 115, transmits the AS security mode message including the AS MAC to the eNB 113, verifies the integrity of the NAS SMC and transmits the NAS security mode complete message to the MME 115.

The eNB 113 receives the SMC message from the MME 115. If the SMC message is received, the eNB 113 selects the AS security algorithm and transmits the AS SMC message including the UE security capability, the selected AS security algorithm and the AS MAC to the UE 111. If the AS security mode complete message including the AS MAC is received from the UE 111 in response to the AS SMC message, the eNB 113 transmits the SMC response message including the selected AS security algorithm and security mode complete message to the MME 115 in response to the SMC message.

The MME 115 receives the UE security capability from the UE 111. If the UE security capability is received from the UE 111, the MME 115 selects the NAS security algorithm and transmits the SMC message including the UE security capability to the eNB 113 and the NAS SMC message including the UE security capability to the UE 111.

Figure 4:
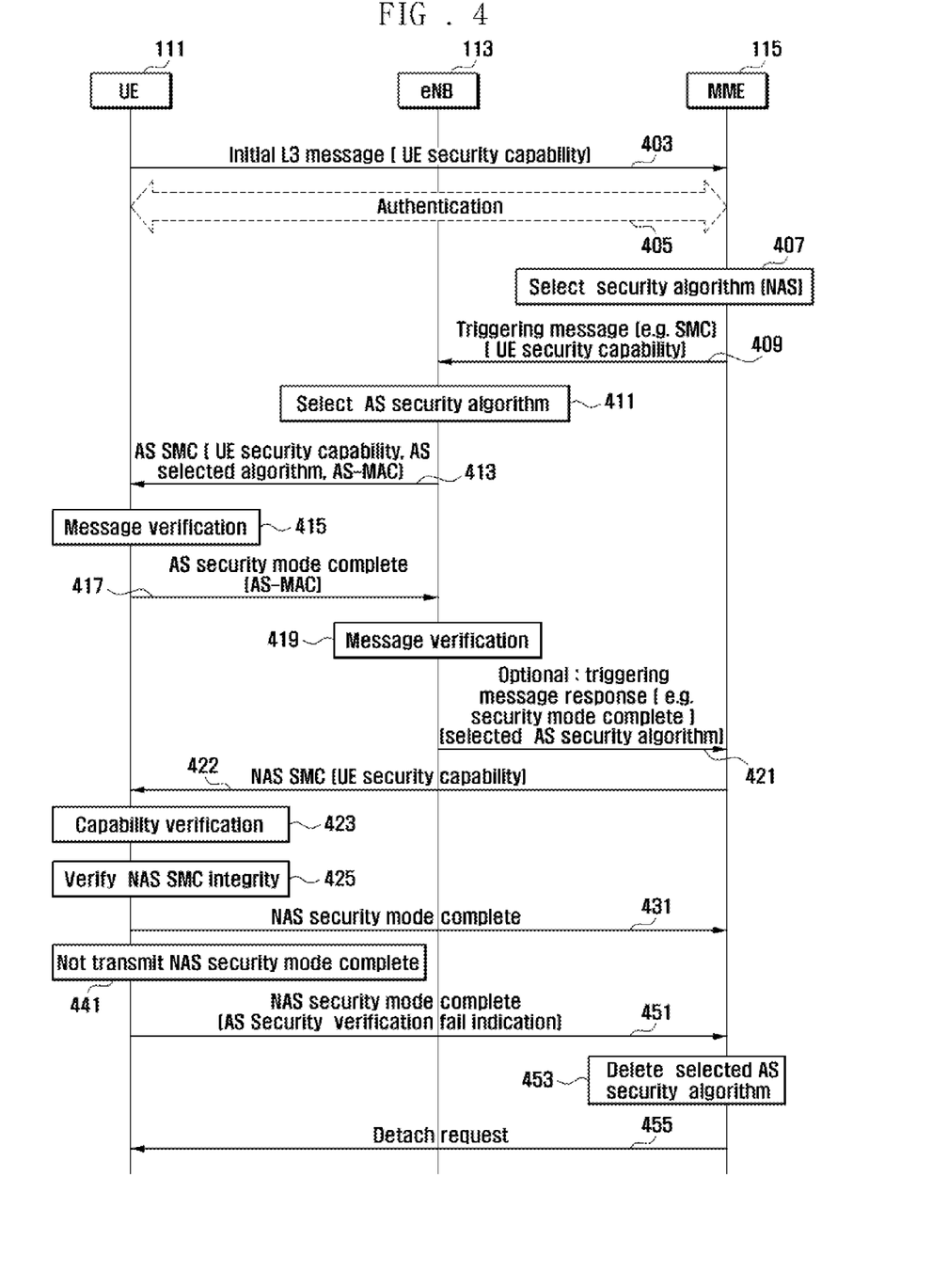
FIG. 4 is a sequence diagram illustrating operations of entities of a wireless communication system of a security method according to an exemplary embodiment of the present invention.

FIG. 4 is a sequence diagram illustrating operations of entities of a wireless communication system of a security method according to an exemplary embodiment of the present invention.

Referring to FIG. 4, a UE 111 transmits an Initial L3 message (e.g., a NAS message) to an MME 115 in step 403. The Initial L3 message includes UE security capability information. An Initial NAS message may be an Initial ATTACH REQUEST message or a TAU REQUEST message. When the Initial L3 message is received, the MME 115 may optionally perform an authentication procedure with the UE 111 and eNB 113 in step 405.

Upon receipt of the Initial L3 message, the MME 115 selects a security capability, i.e., a security algorithm, to be used in the following security procedure in step 407. Here, the MME 115 selects the NAS security algorithm. The MME 115 then transmits to the eNB 113 a triggering message for triggering an AS information Security Mode Command (e.g., SMC) in step 409. The triggering message contains the UE security capability received from the UE 111.

Upon receipt of the triggering message, the eNB 113 selects an AS security algorithm from the list of algorithms allowed for use in network management in step 411. At this time, the eNB 113 may select the security algorithm allowed for the AS message transmission which is included in the UE security capability from the MME 115 or a security algorithm in the list of previously allowed security algorithms preset by the eNB 113 and matching the UE security capability, in order of priority. Once the AS security algorithm is selected, the eNB 113 transmits an AS SMC message to the UE 111 in step 413. Here, the AS SMC message includes an AS selected security algorithm, an AS-MAC and the UE security capability. The UE security capability information is identical with the UE security capability information transmitted from the MME 115 to the eNB 113 in step 409.

Upon receipt of the AS SMC message, the UE 111 verifies the AS SMC message integrity using the MAC information in step 415. The UE 111 transmits to the eNB 113 an AS security mode complete message in step 417. The AS security mode complete message contains the AS MAC information to be integrity protected. Upon receipt of the AS security mode complete message, the eNB 113 verifies the AS security mode complete message using the AS MAC information in step 419.

After verifying the AS security mode complete message, the eNB 113 may optionally transmit a triggering response message to the MME 115 in response to the triggering message in step 421. The triggering response message may be a security mode complete message and contains the AS selected security algorithm. The AS-selected security algorithm may be transmitted from the MME 115 to a target network as the UE information, when the UE 111 moves in an idle mode afterwards. Since the AS-selected security algorithm information is not verified to be handled as incomplete information, the information is verified through steps following step 423.

Upon receipt of the triggering response message, the MME 115 transmits the UE a NAS SMC message in step 422. The NAS SMC message contains the UE security capability transmitted by the UE 111 in step 403 and is an integrity-protected message by the NAS security algorithm selected in step 407. Accordingly, the NAS security algorithm content contained in the NAS SMC message is integrity-protected.

In step 423, upon receipt of the NAS SMC message, the UE 111 verifies the security capability by comparing the UE security capability received through steps 409 to 413 and the UE security capability received in step 422. In step 425, the UE 111 then verifies the NAS SMC message by comparing the UE security message which it has transmitted in step 403 and the UE security capability carried by the integrity-protected NAS SMC message received in step 421. When both the verifications are successful in step 423 and step 425, the UE 111 transmits to the MME a NAS security mode complete message in step 431.

Otherwise, if at least one of the verifications failed in steps 423 and 425, the UE may not transmit the NAS security mode complete message to the MME in step 441. If the verification has failed in step 423 but succeeded in step 425, the UE 111 transmits to the MME 115 a NAS security mode complete message containing an AS security verification failure indicator in step 451. Upon receipt of the NAS security mode complete message containing the AS security verification failure indicator, the MME 115 deletes the selected AS security algorithm in step 453 and transmits a Detach Request message to the UE 111 in step 455.

The operations of individual entities involved in the security method above are described below.

The UE 111 transmits the Initial L3 message including the UE security capability to the MME 115. If the AS SMC message including the UE security capability, the AS security algorithm and the AS MAC is received from the eNB 113 after transmitting the Initial L3 message, the UE 111 verifies the integrity of the AS message using the AS MAC and transmits the AS security mode complete message containing the AS MAC to the eNB 113. Also, if the NAS SMC message contains the UE security capability from the MME 115, the UE 111 verifies the UE security capability contained in the NAS SMC message and the integrity of the NAS SMC message in series and transmits the NAS security mode complete message to the MME 115.

The eNB 113 receives the SMC message containing the UE security capability from the MME 115. If the SMC message is received, the eNB 113 selects the AS security algorithm and transmits the AS security mode complete message containing the UE security capability, the selected AS security algorithm, and the AS MAC to the UE 111. If the AS security mode complete message containing the AS MAC is received from the UE 111 in response to the AS SMC message, the eNB 113 transmits the triggering response message containing the selected AS security algorithm and the security mode complete message to the MME 115.

The MME 115 receives the Initial L3 message containing the UE security capability for the UE 111. If the Initial L3 message is received, the MME 115 selects the NAS security algorithm and transmits the SMC message containing the UE security capability to the eNB 113 and the NAS SMC message containing the UE security capability to the UE 111.

Figure 5:
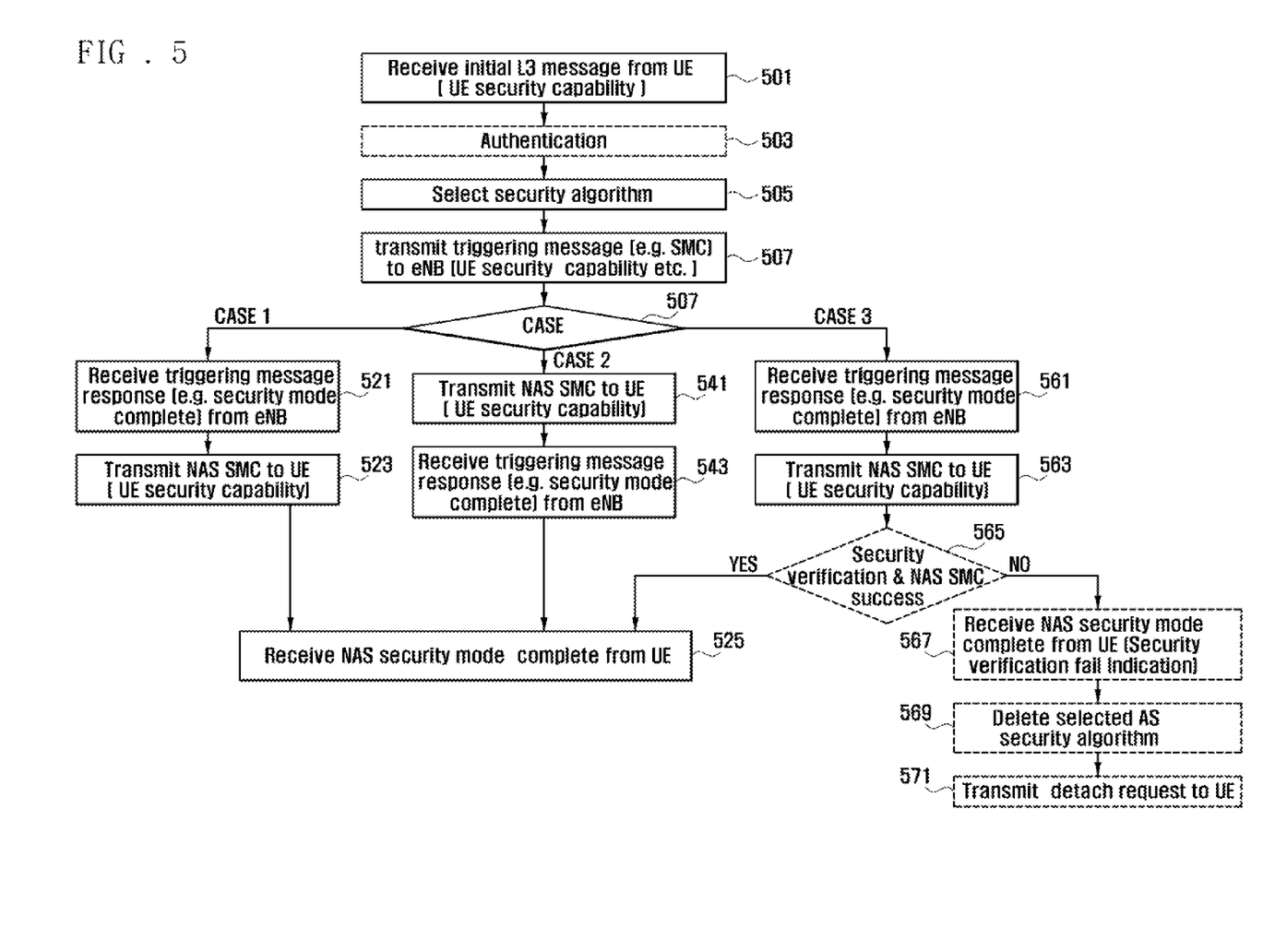
FIG. 5 is a flowchart illustrating operations of a Mobility Management Entity (MME) for supporting a security procedure in a wireless communication system according to an exemplary embodiment of the present invention.

FIG. 5 is a flowchart illustrating operations of an MME for supporting a security procedure in a wireless communication system according to an exemplary embodiment of the present invention.

Referring to FIG. 5, the MME 115 receives an Initial L3 message transmitted by a User Equipment (UE) 111 in step 501. The Initial L3 message includes the UE security capability information. When the Initial L3 message is received, the MME 115 may perform an authentication procedure with the MME 115 and the eNB 113 in step 503. The authentication procedure may be an optional procedure. The MME 115 then selects an NAS security algorithm in step 505 and transmits to the eNB 113 an AS SMC trigger message for triggering the eNB 113 to transmit an AS SMC message to the UE 111 in step 507. The AS SMC trigger message may be an SMC message and includes the UE security capability information.

After the transmission of the AS SMC trigger message, the MME 115 may control the UE security capability processing in three ways as described below.

In a first case, the MME 115 waits for receiving an AS SMC trigger response message transmitted in response to the AS SMC trigger message. The MME 115 receives the AS SMC trigger response message in step 521. The AS SMC trigger response message may be a security mode complete message. Once the AS SMC trigger response message is received, the MME 115 transmits a NAS SMC message to the UE 111 in step 523. The UE security capability information carried by the NAS SMC message is security-protected. In response to the NAS SMC message, the MME 115 receives an NAS security mode complete message transmitted by the UE 111 in step 525.

In a second case, the MME 115 transmits to the UE 111 a NAS SMC message including the UE security capability in step 541. After the transmission of the NAS SMC message to the UE 111, the MME receives the AS SMC trigger response message in response to the AS SMC trigger message transmitted in step 507 from the eNB 113 in step 543. The AS SMC trigger response message includes an AS security algorithm selected by the eNB 113. The AS security algorithm may be one of UE information transmitted from the MME 115 to the target eNB 113, when the UE 111 later moves in an idle mode. The MME 115 then receives the NAS security mode complete message transmitted by the UE 111 in step 525.

In a third case, the MME 115 waits for receiving an AS SMC Trigger response message after the transmission of the AS SMC trigger message in step 507. In step 561, if the AS SMC trigger response message is received in response to the AS SMC trigger message transmitted in step 507, the MME 115 transmits to the UE 111 a NAS SMC containing the UE security capability information in step 563. The MME 115 then verifies the security capability and the NAS SMC integrity in step 565. If the UE 111 succeeds in verifying both the security capability and NAS SMC integrity, the procedure goes to step 525. Otherwise if the UE 111 fails to verify at least one of the security capability and the NAS SMC integrity, various processes may be performed. The various processes after the verification failure are described below with reference to FIG. 7. FIG. 5 illustrates one of two possible situations, i.e., when the security verification fails and the NAS SMC verification succeeds. If the UE 111 fails to verify the security capability and succeed to verify the NAS SMC integrity, the MME 115 waits for receiving the NAS security mode complete message transmitted by the UE 111. The MME 115 receives the NAS security mode complete message including a Security verification failure indicator from the UE 111 in step 567. If the received NAS security mode complete message includes the Security verification failure indicator in step 567, the MME 115 deletes the Security algorithm selected by the eNB 113 in step 569 and transmits a Detach Request message to the UE 111 in step 571.

Figure 6:
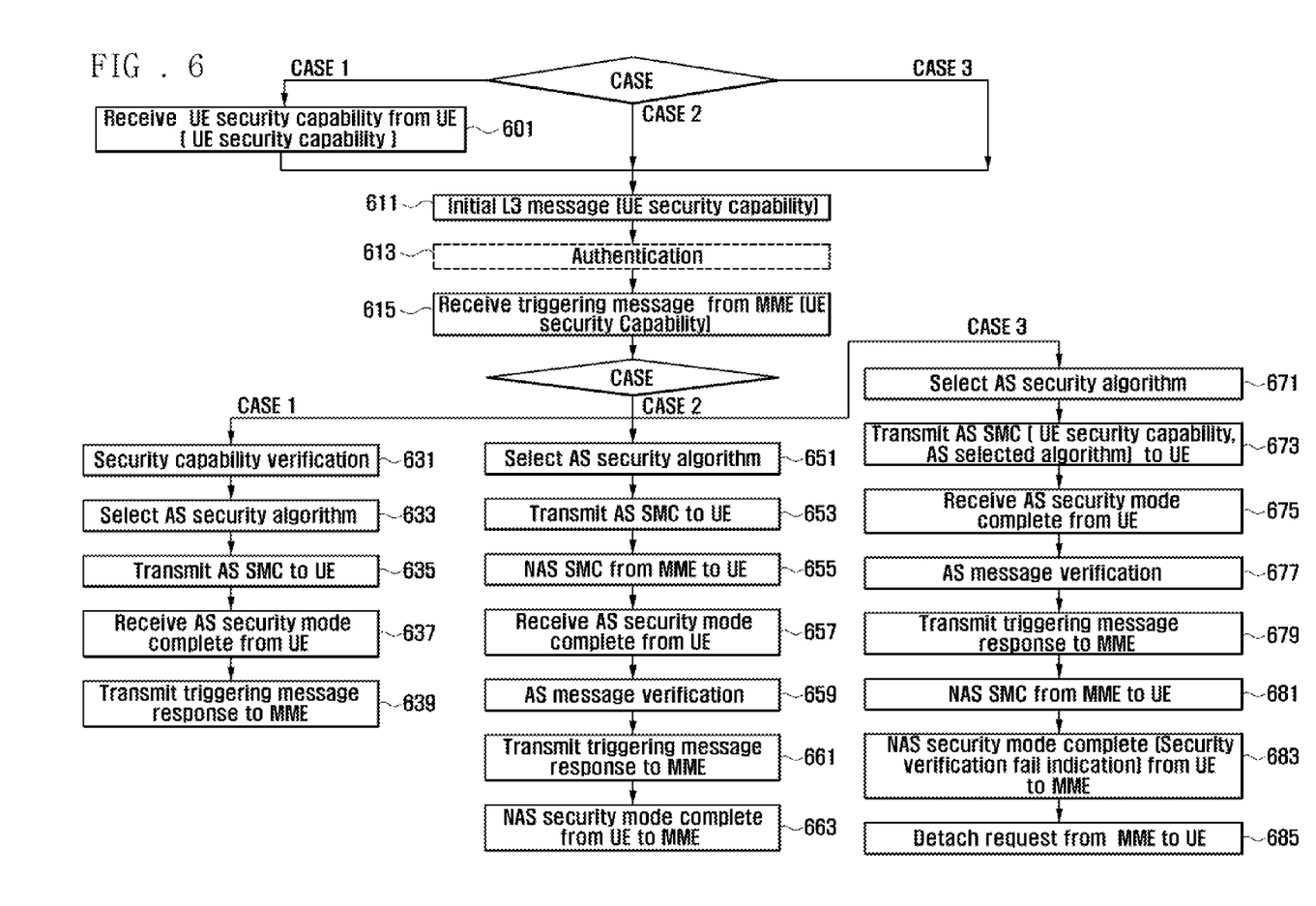
FIG. 6 is a flowchart illustrating operations of an evolved Node B (eNB) for supporting a security procedure in a wireless communication system according to an exemplary embodiment of the present invention.

FIG. 6 is a flowchart illustrating operations of an eNB for supporting a security procedure in a wireless communication system according to an exemplary embodiment of the present invention.

Referring to FIG. 6, the eNB 113 may control a UE security capability processing in three ways as described below.

In a first case, the eNB 113 receives the UE security capability information transmitted by the UE 111 in step 601.

In FIG. 6, steps 611 to 615 are commonly applied to the exemplary three cases. An MME 115 receives an Initial L3 message from the UE 111 in step 611. The Initial L3 message includes the UE security capability information. If the Initial L3 message is received, the MME 115 may perform an authentication process with the UE 111 and the eNB 113 in step 613. The authentication process may be optional. After the optional authentication process, the eNB 113 receives from the MME 115 an AS SMC trigger message triggering the eNB 113 to transmit the AS SMC message to the UE 111 in step 615. The AS SMC trigger message may be an SMC message and includes the UE security capability information.

The eNB 113 then verifies the UE security capability by comparing the UE security capability received from the UE 111 and the UE security capability carried by the AS SMC trigger message in step 631. Once the UE security capability is verified successfully, the eNB 113 selects an AS security algorithm in step 633 and transmits the AS SMC message including the AS security algorithm to the UE 111 in step 635. The eNB 113 receives a AS security mode complete message transmitted by the UE 111 in response to the AS SMC message in step 637 and transmits the AS SMC trigger response message to the MME 115 in response to the AS SMC trigger message in step 639. The AS SMC trigger message may be the security mode complete message.

In a second case, the eNB 113 selects the AS security algorithm after receiving the AS SMC trigger message transmitted by the MME 115 in step 651 and transmits the AS SMC message to the UE 111 in step 653. The MME 115 transmits the NAS SMC message to the UE 111 in step 655. Consequently, the eNB 113 receives the AS Security Mode complete message transmitted by the UE 111 in step 657 and verifies the AS message integrity in step 659. Once the AS message is verified successfully, the eNB 113 transmits the AS SMC trigger response message to the MME 115 in response to the AS SMC trigger message in step 661. The AS SMC trigger response message includes the AS security algorithm. The AS security algorithm may be transmitted from the MME 115 to the target eNB 113 as UE information when the UE 111 moves in an idle mode afterwards. The UE 111 also transmits the NAS security mode complete message to the MME 115 in step 663.

In a third case, the eNB 113 selects the AS security algorithm upon receipt of the AS SMC trigger message transmitted by MME 115 in step 671 and transmits the AS SMC message to the UE 111 in step 673. The eNB 113 then receives the AS security mode complete message transmitted by the UE 111 in response to the AS SMC message in step 675 and verifies the integrity of the AS message in step 677. If the integrity of the AS message is verified successfully, the eNB 113 transmits the AS SMC trigger response message to the MME 115 in response to the AS SMC trigger message in step 679. The AS SMC trigger response message includes the AS security algorithm selected by the eNB 113. The AS security algorithm may be transmitted from the MME 115 to a target eNB as one of UE information when the UE 111 moves in an idle mode afterwards. The MME 115 transmits the NAS SMC message to the UE 111 in step 681. If the UE 111 fails to verify the security or the integrity of the NAS SMC message, the UE 111 transmits the NAS security mode complete message including the security verification failure indicator to the MME 115 in step 683. Upon receipt of the NAS security mode complete message including the security verification failure indicator, the MME 115 transmits a Detach Request message to the UE 111 in step 685.

In the first case of FIG. 6, the operations of the eNB 113 include receiving the UE security capability transmitted by the UE 111, receiving an AS SMC trigger message (including the UE security capability selected by the MME 115) transmitted by the MME 115, comparing the UE security capabilities received from the UE 111 and the MME 115 to verify the UE security, selecting a AS security algorithm, transmitting a AS security mode complete message including the selected AS security algorithm and a AS MAC to the UE 111, and transmitting, a AS SMC trigger response message to the MME 115, when the AS security mode complete message is received.

In the second case of FIG. 6, the operations of the eNB 113 include receiving a AS SMC trigger message including the UE security capability selected by the MME 115, selecting a AS security algorithm indicated in the AS SMC trigger message transmitted by the MME 115, transmitting a AS SMC message including the UE security capability, the selected AS security algorithm and the AS MAC to the UE 111, and transmitting a AS SMC trigger response message including the AS security mode complete message to the MME 111, when the AS security mode complete message is received from the UE 111.

In the third case of FIG. 6, the operations of the eNB 113 include receiving a AS SMC trigger message including the UE security capability selected by the MME 115, selecting a AS security algorithm indicated in the AS SMC trigger message, transmitting a AS SMC message including the UE security capability, the selected AS security algorithm, and the AS MAC to the UE 111, verifying the integrity of the AS security mode complete message, when the AS security mode complete message including the AS MAC is received from the UE 111, and transmitting a AS SMC trigger response message including the AS security mode complete message to the MME 115.

Figure 7:
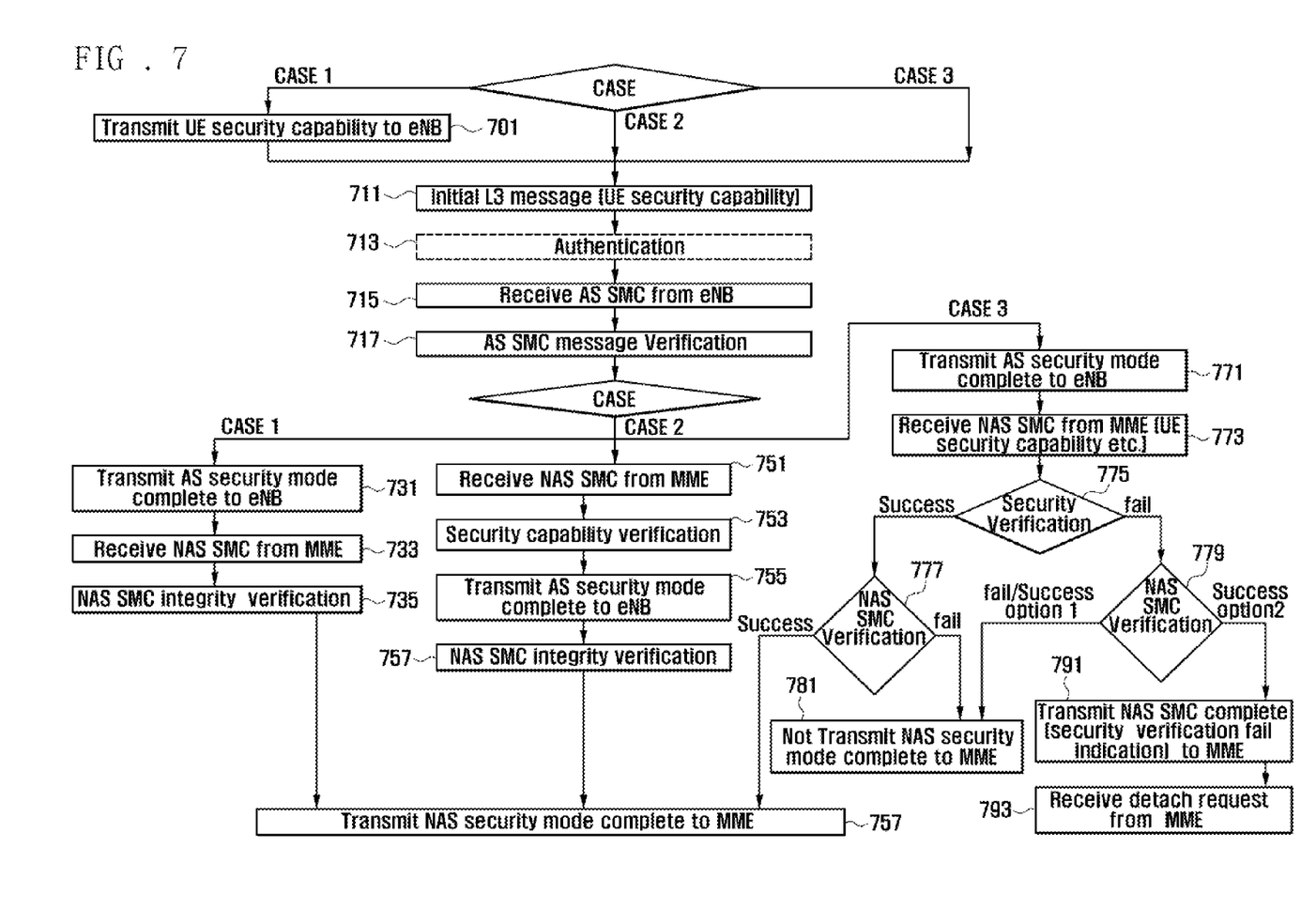
FIG. 7 is a flowchart illustrating a flowchart illustrating operations of a User Equipment (UE) for supporting a security procedure in a wireless communication system according to an exemplary embodiment of the present invention.

FIG. 7 is a flowchart illustrating operations of a UE for supporting a security procedure in a wireless communication system according to an exemplary embodiment of the present invention.

In a first case, the UE 111 transmits a UE security capability to an eNB 113 in step 701.

Referring to FIG. 7, steps 711 to 715 are commonly applied to the exemplary three cases. The MME 115 receives the Initial L3 message from the UE 111 in step 711. The Initial L3 message includes the UE security capability information. If the Initial L3 message is received, the MME 115 may perform an authentication process with the UE 111 and the eNB 113 in step 713. The authentication process may be optional. After the optional authentication process, the eNB 113 receives from the MME 115 an AS SMC trigger message triggering the eNB 113 to transmit the AS SMC message to the UE 111 in step 715. The AS SMC trigger message may be an SMC message and includes the UE security capability information.

The UE then transmits an AS security mode complete message to the eNB 113 in step 731. Steps 733 to 737 constitute the NAS SMC processing procedure. The UE 111 receives a NAS SMC message transmitted by the MME 115 in step 733. If the NAS SMC message is received, the UE 111 verifies the integrity of the NAS SMC message in step 735 and, if the integrity verification is successful, transmits a NAS security mode complete message to the MME 115 in step 737.

In a second case, the UE 111 receives a NAS SMC message transmitted by the MME 115 in step 751. If the NAS SMC message is received, the UE 111 verifies the UE security capability in step 753. If the UE security capability is verified successfully, the UE transmits an AS security mode complete message to the eNB 113 in step 755. The UE 111 then verifies the integrity of the NAS SMC message in step 757. If the integrity of the NAS SMC message is verified successfully, the UE 111 transmits a NAS security mode complete message to the MME 115.

In the second case, the UE 111 transmits an AS security mode complete message to the eNB 113 in step 771. The UE 111 then receives a NAS SMC message transmitted by the MME 115 in step 773. The NAS SMC message is integrity-protected and includes the UE security capability information. In step 775, if the NAS SMC message is received, the UE 111 verifies the UE security capability by comparing the UE security capability transmitted by the eNB 111 in step 715 and the UE security capability carried by the NAS SMC message transmitted by the MME 115 in step 773. If the integrity of the UE security capability is verified successfully, the UE 111 verifies the integrity of the NAS SMC message in step 777. If the integrity of the NAS SMC message is verified successfully, the UE 111 transmits an NAS security mode complete message to the MME 115 in step 757.

Otherwise, if the UE 111 fails to verify the integrity of the NAS SMC message in step 777, the UE 111 terminates the security procedure without transmitting the NAS security mode complete message to the MME 115 in step 781. If the UE 111 fails to verify the UE security capability in step 775, the UE 111 verifies the NAS SMC message in step 779. At this time, if the UE 111 fails to verify the integrity of the NAS SMC message too, the UE 111 terminates the security procedure without transmitting the NAS security mode complete message to the MME 115 in step 781. In one option, even if the UE 111 succeeds in verifying the integrity of the NAS SMC message, the UE 111 terminates the security procedure without transmitting the NAS security mode complete message to the MME 115 if the UE security capability verification has failed in step 775. In another option, if the UE 111 succeeds in verifying the integrity of the NAS SMC message in step 779, the UE 111 transmits the NAS security mode complete message including the security verification failure indicator to the MME 115 in step 791 even though the UE security capability verification has failed in step 775. As a sequence, the UE 111 receives a Detach Request message from the MME 115 in step 793.

In the first case of FIG. 7, the operations of the UE 111 include transmitting the UE security capability to the MME 115 and the eNB 113, receiving from the eNB 113 the AS SMC message including the UE security capability, the AS security algorithm selected by the eNB 113 as a result of the UE security capability verification and the AS MAC, verifying the integrity of the AS SMC message using the AS MAC, transmitting the AS security mode complete message including the AS SMC message to the eNB 113, verifying the integrity of the NAS SMC message, when the NAS SMC message including the UE security capability id received from the MME 115, and transmitting the NAS security mode complete message to the MME 115.

In the second case of FIG. 7, the operations of the UE 111 include transmitting the UE security capability to the MME 115, receiving the AS SMC message including the UE security capability, the AS security algorithm and the AS MAC from the eNB 113, verifying the integrity of the AS SMC message using the AS MAC, receiving the NAS SMC message including the UE security capability from the MME 115, verifying the UE security capability by comparing the UE security capabilities received from the eNB 113 and the MME 115, transmitting the AS security mode complete message to the eNB 113, and transmitting the NAS security mode complete message to the MME 115.

In the third case of FIG. 7, the operations of the UE 111 include transmitting the UE security capability to the MME, receiving the AS SMC message including the UE security capability, the AS security algorithm and the AS MAC from the eNB 113, verifying the integrity of the AS SMC message using the AS MAC, transmitting the AS security mode complete message to the eNB 113, receiving the NAS SMC message including the UE security capability from the MME 115, verifying the UE security capability be comparing the UE security capabilities received from the eNB 113 and MME 115, and transmitting the NAS security mode complete message to the MME 115.

As described above, a security method for a wireless communication system including a UE, an MME, and an eNB according to exemplary embodiments of the present invention may protect a AS SMC message transmitted from the eNB to the UE for a AS protocol operation and a NAS SMC transmitted from the MME to the UE from a MITM attack. Thereby, communication security may be improved.

Also, the security method of the exemplary embodiments of the present invention performs verification of information and messages exchanged between network entities efficiently, protects communications related to a UE security capacity among the UE, eNB and MME. Thereby security management may be improved.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A security processing method of a User Equipment (UE) in a wireless communication system, the method comprising:
transmitting a Layer 3 (L3) message comprising a UE security capability to a Mobility Management Entity (MME) and an evolved Node B (eNB);
receiving an Access Stratum Security Mode Command (AS SMC) comprising a AS security algorithm selected by the eNB, as a result of verification of the UE security capability and information received from the MME, and a AS Message Authentication Code (MAC);
transmitting a AS security mode complete message comprising the AS SMC to the eNB after verification of integrity of the AS SMC using the AS MAC; and
transmitting, when receiving a Non Access Stratum (NAS) SMC comprising the UE security capability, a NAS security mode complete message to the MME after verification of integrity of the NAS SMC,
wherein the AS security algorithm is selected in order of priority from at least one of a security algorithm allowed for a AS message transmission in the UE security capability from the MME and a security algorithm in a list of previously allowed security algorithms preset by the eNB and matching the UE security capability.

2. The method of claim 1, wherein the verification of the integrity of the NAS SMC comprises comparing the UE security capability from the UE and the UE security capability from the MME.

3. A security processing method of an evolved Node B (eNB) in a wireless communication system, the method comprising:
receiving a Layer 3 (L3) message comprising a User Equipment (UE) security capability from a UE;
receiving a Security Mode Command (SMC) comprising the UE security capability from a Mobility Management Entity (MME);
selecting an Access Stratum (AS) security algorithm with verification of the UE security capability by comparing the UE security capability received from the UE and UE security capability carried by the SMC;
transmitting a AS SMC comprising the selected AS security algorithm and an AS Message Authentication Code (AS MAC) to the UE; and
transmitting, when a AS security mode complete message comprising the AS SMC is received, an SMC response message to the MME,
wherein the AS security algorithm is selected in order of priority from at least one of a security algorithm allowed for a AS message transmission in the UE security capability from the MME and a security algorithm in a list of previously allowed security algorithms preset by the eNB and matching the UE security capability.

4. A security processing method of a User Equipment (UE) in a wireless communication system, the method comprising:
transmitting a Layer 3 (L3) message comprising a UE security capability to a Mobility Management Entity (MME);
receiving an Access Stratum Security Mode Command (AS SMC) comprising the UE security capability, a AS security algorithm and a AS Message Authentication Code (MAC) from an evolve Node B (eNB);
verifying integrity of the AS SMC using the AS MAC;
receiving a Non Access Stratum (NAS) SMC comprising the UE security capability from the MME; and
verifying the UE security by comparing the UE securities received from the eNB and the MME and transmitting an AS security mode complete message to the eNB and a NAS security mode complete message to the MME,
wherein the AS security algorithm is selected in order of priority from at least one of a security algorithm allowed for a AS message transmission in the UE security capability from the MME and a security algorithm in a list of previously allowed security algorithms preset by the eNB and matching the UE security capability.

5. The method of claim 4, wherein the NAS security mode complete message is transmitted to the MME if the NAS SMC message is verified by comparing the UE security capability transmitted to the MME and the UE security capability contained in an integrity-protected NAS SMC.

6. A security processing method of an evolved Node B (eNB) for managing a User Equipment (UE) security capability in a wireless communication system, the method comprising:

receiving a Security Mode Command (SMC) comprising the UE security capability selected by a Mobility Management Entity (MME);

selecting an Access Stratum (AS) security algorithm indicated in the SMC and transmitting an AS SMC comprising the UE security capability, the AS security algorithm and a AS Message Authentication Code (MAC) to the UE; and transmitting, when a AS security mode complete message comprising the AS Message Authentication Code (MAC) is received from the UE, an SMC response message comprising the AS security mode complete message to the MME, wherein the AS security algorithm is selected in order of priority from at least one of a security algorithm allowed for a AS message transmission in the UE security capability from the MME and a security algorithm in a list of previously allowed security algorithms preset by the eNB and matching the UE security capability.

7. A security processing method of a User Equipment (UE) in a wireless communication system, the method comprising:

transmitting a Layer 3 (L3) message comprising a UE security capability to a Mobility Management Entity (MME);

receiving an Access Stratum Security Mode Command (AS SMC) comprising the UE security capability, a AS security algorithm and a AS Message Authentication Code (MAC) from an evolved Node B (eNB);

transmitting a AS security mode complete message to the eNB after verifying integrity of the AS SMC message using the AS MAC;

receiving a Non Access Stratum (NAS) SMC comprising the UE security capability from the MME; and transmitting a NAS security mode complete message to the MME after verifying the UE security capability by comparing the UE security capabilities received from the eNB and MME, wherein the AS security algorithm is selected in order of priority from at least one of a security algorithm allowed for a AS message transmission in the UE security capability from the MME and a security algorithm in a list of previously allowed security algorithms preset by the eNB and matching the UE security capability.

8. The method of claim 7, further comprising verifying the NAS SMC message by comparing the UE security message received from the UE and the UE security capability carried by an integrity-protected NAS SMC message to the MME.

9. The method of claim 7, further comprising transmitting to the MME an NAS security mode complete message comprising an AS security verification failure indicator if the UE security capability verification failed.

10. The method of claim 9, further comprising receiving a Detach Request message when the MME receives the NAS security mode complete message comprising the AS security verification failure indicator.

11. A security processing method of an evolved Node B (eNB) for managing a User Equipment (UE) security capability in a wireless communication system, the method comprising:

receiving a Security Mode Command (SMC) comprising the UE security capability selected by a Mobility Management Entity (MME);

selecting an Access Stratum (AS) security algorithm indicated in the SMC and transmitting a AS SMC comprising the UE security capability, the AS security algorithm and a AS Message Authentication Code (MAC) to the UE; and transmitting, when a AS security mode complete message comprising the AS Message Authentication Code (MAC) is received from the UE, an SMC response message comprising the AS security mode complete message to the MME after verifying integrity of the message received from the UE, wherein the AS security algorithm is selected in order of priority from at least one of a security algorithm allowed for a AS message transmission in the UE security capability from the MME and a security algorithm in a list of previously allowed security algorithms preset by the eNB and matching the UE security capability.

12. A security system for a wireless communication system, the system comprising:

a User Equipment (UE) for transmitting a Layer 3 (L3) message comprising a UE security capability, for verifying an Access Stratum Security Mode Command (AS SMC) using a AS Message Authentication Code (MAC), when the AS SMC comprising a AS security algorithm and the AS MAC is received, for transmitting a AS security mode complete message in response to the AS SMC, for verifying integrity of a Non Access Stratum (NAS) SMC, when the NAS SMC comprises the UE security capability, and for transmitting an NAS security mode complete message in response to the NAS SMC;

an evolved Node B (eNB) for receiving the UE security capability from the UE and an SMC comprising the UE security capability, for selecting the AS security algorithm as a result of verification of the UE security capability, for transmitting the AS SMC comprising the selected AS security algorithm and the AS MAC to the UE, and for transmitting an SMC response message comprising the selected AS security algorithm and the AS security mode complete message in response to the SMC message, when the AS security mode complete message comprising the AS MAC is received from the UE; and a Mobility Management Entity (MME) for selecting an NAS security algorithm, when the UE security capability is received from the UE, and for transmitting the SMC comprising the UE security capability to the eNB and the NAS AMC comprising the UE security capability to the UE, wherein the AS security algorithm is selected in order of priority from at least one of a security algorithm allowed for a AS message transmission in the UE security capability from the MME and a security algorithm in a list of previously allowed security algorithms preset by the eNB and matching the UE security capability.

13. The system of claim 12, wherein the verification of the integrity of the NAS SMC comprises comparing the UE security capability from the UE and the UE security capability from the MME.

14. A security system for a wireless communication system, the system comprising:

a User Equipment (UE) for transmitting a Layer 3 (L3) message comprising a UE security capability, for verifying integrity of an Access Stratum Security Mode Command (AS SMC) using a AS Message Authentication Code (MAC), when the AS SMC comprising a AS security algorithm and the AS MAC is received, for verifying the UE security capabilities carried by the AS SMC and a Non Access Stratum (NAS) SMC, when the NAS SMC comprises the UE security capability, and for transmitting a AS security mode complete message in response to the AS SMC and an NAS security mode complete message in response to the NAS SMC;

an evolved Node B (eNB) for selecting the AS security algorithm and transmitting the AS SMC comprising the selected AS security algorithm and the AS MAC to the UE, when the SMC comprising the UE security capability is received, and for transmitting a SMC response message comprising the selected AS security algorithm and the security mode complete message in response to the SMC, when the AS security mode complete message comprising the AS MAC is received from the UE; and a Mobility Management Entity (MME) for selecting an NAS security algorithm, when the UE security capability is received from the UE, and for transmitting the SMC comprising the UE security capability to the eNB and the NAS SMC comprising the UE security capability to the UE, wherein the AS security algorithm is selected in order of priority from at least one of a security algorithm allowed for a AS message transmission in the UE security capability from the MME and a security algorithm in a list of previously allowed security algorithms preset by the eNB and matching the UE security capability.

15. The system of claim 14, wherein the NAS security mode complete message is transmitted to the MME if the NAS SMC message is verified by comparing the UE security capability transmitted to the MME and the UE security capability contained in an integrity-protected NAS SMC.

16. A security system for a wireless communication system, the system comprising:

a User Equipment (UE) for transmitting a Layer 3 (L3) message comprising a UE security capability, for verifying integrity of an Access Stratum Security Mode Command (AS SMC) using a AS Message Authentication Code (MAC), when the AS SMC comprising a AS security algorithm and the AS MAC is received, for transmitting a AS security mode complete message comprising the AS MAC in response to the AS SMC, for verifying the UE security capabilities carried by the AS SMC and a Non Access Stratum (NAS) SMC and integrity of the NAS SMC, when the NAS SMC comprises the UE security capability, and for transmitting an NAS security mode complete message in response to the NAS SMC;

an evolved Node B (eNB) for selecting, the AS security algorithm and transmitting the AS SMC comprising the selected AS security algorithm and the AS MAC to the UE, when an SMC including the UE security capability is received, and for transmitting an SMC response message comprising the selected AS security algorithm and the security mode complete message in response to the SMC, when the AS security mode complete message comprising the AS MAC is received from the UE; and a Mobility Management Entity (MME) for selecting a NAS security algorithm, when the UE security capability is received from the UE, and for transmitting the SMC comprising the UE security capability to the eNB and the NAS SMC comprising the UE security capability to the UE, wherein the AS security algorithm is selected in order of priority from at least one of a security algorithm allowed for a AS message transmission in the UE security capability from the MME and a security algorithm in a list of previously allowed security algorithms preset by the eNB and matching the UE security capability.

* * * * *